United States Patent Office 2,864,765
Patented Dec. 16, 1958

2,864,765
DEWATERING ORE CONCENTRATES

Earl George Stoneman and George Archibald Frame, Copper Cliff, Ontario, Canada, assignors to The International Nickel Co., Inc., New York, N. Y., a corporation of Delaware No Drawing. Application February 1, 1954
Serial No. 407,617

Claims priority, application Canada September 1, 1953

10 Claims. (Cl. 210—43)

The present invention relates to dewatering ore concentrates and more particularly to an improved method for dewatering ore concentrates, as by filtration, to produce solids which have a desirably low moisture content and which are readily and easily handled by conventional methods of materials handling.

The art of concentrating mineral ores has been confronted with the problem of dewatering the ore concentrates obtained by the conventional separation methods, in which the minerals are separated from the relatively worthless gangue by flotation in an aqueous medium. The resulting ore concentrates comprise a slurry or pulp, that is, a mixture of ore concentrates and water, which has included an undesirably great proportion of water. Ordinarily, a major portion of this water is removed by filtration, whereby a filter cake is built up on the filter medium. However, in the filtration of ore concentrates as practiced heretofore, the resulting filter cake has often tended to be wet, plastic, and difficult to handle.

Although attempts were made to overcome the foregoing difficulties and other disadvantages, none, as far as we are aware, was entirely successful when carried into practice commercially on an industrial scale.

It has now been discovered that, in the dewatering of ore concentrate slurries or pulps, the handling characteristics of dewatered solids, such as filter cake, comprising ore concentrates can be greatly improved, and the water content thereof generally reduced by the addition of small percentages of special organic compounds to the slurry or pulp prior to dewatering.

It is an object of the present invention to provide a method of dewatering ore concentrates, in which the dewatered solids will retain no more than a desirably low percentage of water.

The invention also contemplates providing a method of dewatering ore concentrates, in which dewatered solids are produced which are readily and easily handled by conventional methods of materials handling.

Another object of the invention is to provide an improved method of filtering ore concentrates, in which the resulting filter cake is free from an undesirably high percentage of water.

It is a further object of the invention to provide an improved method of filtering ore concentrates, in which a filter cake is produced which is readily and easily handled by conventional methods of materials handling.

It is also an object of the invention to provide a dewatering agent to be incorporated in an aqueous slurry of ore concentrates prior to dewatering the same.

Other objects and advantages will become apparent from the following description.

Generally speaking, the present invention contemplates the improvement in the art of dewatering ore concentrate slurries or pulps which comprises incorporating in an ore concentrate slurry or pulp a small but effective amount up to 0.5% by weight of the slurry or pulp solids of a dewatering agent comprising a polyoxyethylene ether of a hexitol anhydride partial long chain fatty acid ester, and then dewatering the thus-treated slurry or pulp, as by filtration, to remove a substantial proportion of the water from the slurry, to provide a friable, easily handled, relatively dry solids cake, and in some cases to increase the speed with which water may be removed from the slurry or pulp.

The ore concentrate slurries or pulps which are treated according to the present invention comprise mixtures of ore concentrate and water, the ore concentrate solids comprising between 50% and 75% of the mixture by weight and the water comprising between 25% and 50% of the mixture by weight. The ore concentrates themselves comprise pulverized ore fractions from which a substantial proportion of the relatively worthless gangue has been removed, as by flotation or other methods of minerals separation, so that the thus-treated concentrates are relatively rich in the minerals which it is desired ultimately to extract. The ore concentrates range in particle size up to a maximum of 48 mesh, or 300 microns.

Concentrates obtained from a variety of ores may be treated according to the present invention. Thus, concentrates of metal sulfides such as chalcopyrite, pentlandite and pyrrhotite can be treated in accordance with the present invention, as well as other ore concentrates.

A relatively small proportion of the aforementioned dewatering agent in the slurry or pulp comprising the filter feed is effective to produce improved dewatering of the slurry or pulp. Thus, it has been found that, in treating ore concentrate pulps containing concentrates of chalcopyrite, pentlandite and pyrrhotite, satisfactory results are obtained using about 0.1 to about 5 pounds of dewatering agent per ton of pulp solids. Preferably, between 0.1 and 2 pounds of dewatering agent per ton of pulp solids are used. When the dewatering agent is used in concentrations greater than 5 pounds per ton, the additional improvement in filter cake characteristics is likely to be more than offset by reagent cost.

It has been found that smaller concentrations of dewatering agent will be effective when the agent is mixed with an organic liquid. Such liquids may broadly comprise liquid hydrocarbons. In general, the more volatile liquid paraffin hydrocarbons, such as kerosene, have been found to be somewhat preferable to the less volatile, more viscous liquid paraffin hydrocarbons, such as fuel oil. Indeed, the dewatering agent will be effective even when diluted with 30 parts of liquid hydrocarbon per part of agent by weight. However, the preferred dilution ratios of dewatering agent to liquid hydrocarbon range between 1:10 and 1:2 by weight.

In carrying the invention into practice, it is preferred to use a dewatering agent comprising polyoxyethylene sorbitan monooleate containing an average of about 5 oxyethylene groups per molecule (such as is sold commercially by the Atlas Powder Company under the name of "Tween 81"). This agent is a lemon-colored, oily liquid which tends to gel on standing. It has a viscosity of 350 to 550 centipoises at 25° C., a specific gravity of 1.00 to 1.05, a flash point of about 550° F., a fire point of about 600° F., and a hydrophile-lipophile balance (HLB) of 10.0.

An example of another polyoxyethylene derivative contemplated by the invention is polyoxyethylene sorbitan tristearate containing an average of about 20 oxyethylene groups per molecule (such as is sold commercially by the Atlas Powder Company under the name of "Tween 65"), and is a light yellow, waxy solid having a titer of 27 to 31 degrees C., a specific gravity of 1.03 to 1.08, a flash point of about 530° F., a fire point of about 570° F., and an HLB of 10.5. Yet another example is polyoxyethylene sorbitan trioleate containing an average of about 20 oxyethylene groups per molecule (such as is sold commercially by the Atlas Powder Company under the name of "Tween 85"). It is a lemon-colored, oily liquid which tends to gel on standing, having a viscosity of 200 to 400 centipoises at 25° C., a specific gravity of 1.00 to 1.05, a flash point of about 565° F., a fire point of about 645° F., and an HLB of 11.0.

It will be noted that each of the three examples set forth above has been esterified with a fatty acid group containing 18 carbon atoms. Other examples of compounds with which the invention may also be practiced are polyoxyethylene ethers of hexitol anhydride partial esters obtained from lauric acid, palmitic acid, and tall oil.

If desired, mixtures of these and/or other polyoxyethylene ethers contemplated by the invention can be used, instead of a single agent. Moreover, it will be appreciated that none of the above agents is itself readily capable of definition by an exact formula. As those skilled in the art will realize, in the synthesis of compounds such as these the degree of anhydridization and the extent to which inclusion of ethylene oxide has proceeded may vary from molecule to molecule. Accordingly, the values assigned to the number of ethylene oxide molecules are of necessity average values.

When the preferred agent comprising the polyoxyethylene sorbitan monooleate described above is mixed with liquid paraffin hydrocarbon, it is preferred to use a mixture consisting of one part of monooleate and five parts of kerosene by weight.

For the purpose of giving those skilled in the art a better understanding of the invention and the advantages thereof, the following illustrative examples are given.

*Example I*

A filter feed slurry was dewatered using a leaf filter of the type commonly used for filterability tests on pulps. The filter cloth used was cotton twill. Cake was built up thereon to a thickness of about one-half inch. The filter was immersed in the pulp for one minute to build up the cake and then withdrawn from the pulp and vacuum applied for two additional minutes to dry the cake. A vacuum of 16 inches of mercury was maintained. Pulp temperature was maintained at about 90° F. The pulp solids of the slurry comprised largely chalcopyrite, pentlandite, pyrrhotite and fine rock. The feed density, expressed as percent solids by weight, was roughly 67%. The particle size, expressed as the percent which passes through a 200-mesh Tyler scale screen when dry, was 70% on the average. No dewatering agent was added to the slurry; and the final cake moisture was 13.6% by weight. The cake was wet and plastic and difficult to handle. The cloth was cleaned, and a duplicate sample of the slurry was filtered under the same conditions; however, prior to filtration, there had been added to this second portion of slurry a small proportion of the sorbitan monooleate polyoxyethylene ether described above amounting to 1.6 pounds per ton of pulp solids. The final cake moisture was 12.1% by weight. The cake was friable, free from surface moisture, and easily handled.

*Example II*

Another portion of the slurry described in Example I was dewatered under the conditions there set forth; but instead of the dewatering agent of Example I, an agent comprising the sorbitan tristearate polyoxyethylene derivative described above was used, in a concentration of one pound per ton of pulp solids. The final cake moisture was 12.2% by weight. The cake was friable, free from surface moisture, and easily handled.

*Example III*

To still another portion of the slurry described in Example I the polyoxyethylene sorbitan monooleate described above was added in a concentration of five pounds per ton of pulp solids. The slurry was then dewatered under the conditions recited in Example I. The final cake moisture was 10.8% by weight. The cake was friable, free from surface moisture, and easily handled.

*Example IV*

The slurry described in Example I was dewatered under the conditions there set forth; but instead of the dewatering agent comprising the undiluted monooleate or tristearate, an agent was used comprising a mixture of the monooleate described above and kerosene. The ratio of monooleate to kerosene was 1:2 by weight. The solution was incorporated in a slurry in a concentration of 1.2 pounds per ton of pulp solids, which is to say, .4 pound of monooleate per ton of pulp solids. The final cake moisture was 12.8% by weight. Again, the filter cake was fairly friable and free from surface moisture and easily handled.

*Example V*

The procedure of Example IV was followed, but a very much more dilute kerosene solution of the monooleate described above was added. The ratio of monooleate to kerosene was 1:10 by weight, and the mixture was added in a proportion of 4.4 pounds of mixture per ton of pulp solids. The final cake moisture was 12.2% by weight. The cake was free from surface moisture, was friable, and handled easily.

*Example VI*

A filter feed slurry was dewatered using a 14' x 16' Dorrco rotary drum filter. The filter cloth used was cotton twill, and cake was built up thereon to a thickness of about ½". The filter speed was 4 minutes per revolution. A vacuum of 23.5 inches of mercury was maintained; and filtration proceeded at a pulp temperature of about 120° F. The pulp solids of the slurry comprised largely chalcopyrite, pentlandite, pyrrhotite and fine rock. The feed density, expressed as percent solids by weight, was roughly 70%. The particle size, expressed as the percent which passes through a 200-mesh screen when dry, was 70% on the average. No dewatering agent was added to the slurry; and the final cake moisture was 13% by weight. The cake was plastic and difficult to handle. A second portion of the same slurry was filtered under the same conditions; however, prior to filtration, there had been added to this second portion of slurry a small proportion of the sorbitan monooleate polyoxyethylene derivative described above, dissolved in kerosene. The mixture contained one part of monooleate to five parts of kerosene by weight and the mixture was added at a rate of 0.9 pound of mixture per ton of pulp solids. The final cake moisture was 10.9% by weight. The cake was friable, free from surface moisture, and easily handled.

As has been pointed out before, the invention is applicable in dewatering a wide range of ore concentrates having varying compositions and physical characteristics. Examples of such concentrates are the sulfide ore concentrates containing values such as nickel sulfide, copper sulfide, iron sulfide, zinc sulfide, or lead sulfide, among others, in proportions ranging between about 50% and 95% by weight, balance essentially gangue. The invention is particularly applicable in the dewatering of metalliferous nickel, copper and iron sulfide ore concentrates such as those produced from the ores occurring in the Sudbury region of Canada, comprising mostly pentlandite, chalcopyrite, and/or pyrrhotite.

The present invention is also particularly applicable in connection with the use of continuous rotary filters of the drum type. However, the invention is useful in any type of ore concentrate dewatering operation, and hence is applicable in connection with sedimentation equipment, such as settling tanks and thickeners, particularly filter thickeners. The invention is also applicable to dewatering operations conducted in other types of vacuum filters and with various types of non-vacuum filters, such as filter presses and other pressure filters; in dewatering equipment that utilizes centrifugal forces, such as centrifugal filters and centrifuges; and in equipment which serves to drain water from the concentrates under the influence of gravity. The invention is also applicable in other types of equipment or operations to which the dewatering of ore concentrates is either a necessary or a desirable incident.

It is to be observed that the present invention provides an improved process of dewatering ore concentrates which comprises establishing an aqueous slurry of ore concentrates containing a small but effective amount up to about 0.5% by weight of the ore concentrate solids of a polyoxyethylene ether of a hexitol anhydride partial long chain fatty acid ester, and subsequently separating a substantial proportion of the water from the ore concentrates by filtration, thereby forming a filter cake containing substantially less water than when the slurry contains no such ether.

Moreover, the invention provides an improved process comprising the use of a polyoxyethylene ether of a hexitol anhydride partial long chain fatty acid ester as a dewatering agent in dewatering an aqueous slurry of ore concentrates to produce dewatered solids.

Furthermore, the invention provides, as a new article of manufacture, a dewatering agent comprising a polyoxyethylene ether of a hexitol anhydride partial long chain fatty acid ester, or such an ether mixed with a liquid hydrocarbon.

It is to be noted that the present invention is not to be confused with the dewatering of ore concentrates using the filter aids heretofore used to some extent by the art, such as diatomaceous earth or kieselguhr, which consists of siliceous skeletons of very small marine organisms. These known filter aids are inorganic, consisting of practically pure silica. They comprise finely divided solids consisting of hard, strong particles which in themselves would form a noncompressible cake. They are useful to some extent in filter operations since they offer large surfaces for the adsorption of colloids which otherwise would tend to clog the filter medium. However, the concentrates treated in accordance with the present invention are composed largely of granular materials of a comparatively coarse size, and addition of granular filter aids is not effective. By contrast, the present invention apparently involves changing the surface characteristics of the particles in such a manner that they have less tendency to retain moisture, although the actual mechanism is not fully understood.

Although the present invention has been described in conjunction with preferred embodiments, it is to be understood that modifications and variations may be resorted to without departing from the spirit and scope of the invention, as those skilled in the art will readily understand. Thus, it will be understood that the invention is applicable to the dewatering of wet metal sulfides, generally; and the term "ore concentrates" as used herein includes such sulfides, as well as other metalliferous materials. Such modifications and variations are considered to be within the purview and scope of the invention and appended claims.

We claim:

1. In a process of treating ore concentrates wherein there is established an aqueous slurry of ore concentrates which is subsequently subjected to a filtration operation to form a filter cake, the improved method of dewatering the ore concentrates to provide a filter cake which is friable and easily handled by conventional methods of materials handling which comprises establishing an aqueous slurry of ore concentrates having a particle size of up to 300 microns, incorporating into said aqueous slurry prior to filtration a polyoxyethylene ether of a hexitol anhydride partial long chain fatty acid ester having a hydrophile-lipophile balance of not more than about 11 in a small but effective amount up to about 0.5% by weight of ore concentrates to thereby form on filtration a filter cake which has better handling characteristics and which is further characterized by friability and a substantially lower porportion of water as compared to the filter cake formed when said ether is not added.

2. In a process of treating ore concentrates wherein there is established an aqueous slurry of ore concentrates which is subsequently subjected to a filtration operation to form a filter cake, the improved method of dewatering the ore concentrates to provide a filter cake which is friable and easily handled by conventional methods of materials handling which comprises establishing an aqueous slurry of ore concentrates having a particle size of up to 300 microns, incorporating into said aqueous slurry prior to filtration a small but effective amount up to about 0.5%, by weight of ore concentrates, of at least one dewatering agent selected from the group consisting of polyoxyethylene sorbitan monooleate containing an average of about 5 oxyethylene groups per molecule and having a hydrophile-lipophile balance of about 10, polyoxyethylene sorbitan tristearate containing an average of about 20 oxyethylene groups per molecule and having a hydrophile-lipophile balance of about 10.5 and polyoxyethylene trioleate containing an average of about 20 oxyethylene groups per molecule and having a hydrophile-lipophile balance of about 11 to thereby form on filtration a filter cake which has better handling characteristics and which is further characterized by friability, a surface substantially free of moisture and a lower proportion of retained water as compared to the filter cake formed when no such dewatering agent is added.

3. A process as described in claim 2 wherein the dewatering agent is added in an amount of about 0.1 to about 5 pounds per ton of ore concentrates.

4. In a process of treating ore concentrates wherein there is established an aqueous slurry of ore concentrates which is subsequently subjected to a filtration operation to form a filter cake, the improved method of dewatering the ore concentrates to provide a filter cake which is friable and easily handled by conventional methods of materials handling which comprises establishing an aqueous slurry of ore concentrates having a particle size of up to 300 microns, incorporating into said aqueous slurry prior to filtration a dewatering agent comprised of a mixture of one part by weight of a polyoxyethylene ether of a hexitol anhydride partial long chain fatty acid ester having a hydrophile-lipophile balance of not more than 11 and a liquid hydrocarbon in an amount up to 30 parts by weight to thereby form on filtration a filter cake which has better handling characteristics and which is further characterized by friability and a lower proportion of retained moisture as compared to the filter cake formed when no such dewatering agent is added.

5. In a process of treating ore concentrates wherein there is established an aqueous slurry of ore concentrates which is subsequently subjected to a filtration operation to form a filter cake, an improved method of dewatering the ore concentrates and of forming a filter cake which is friable and easily handled by conventional methods of materials handling which comprises establishing an aqueous slurry of ore concentrates having a particle size of up to 300 microns, incorporating into said aqueous slurry prior to filtration a dewatering agent comprised of a mixture of up to 30 parts by weight of a liquid hydrocarbon and one part by weight of at least one compound selected from the group consisting of polyoxyethylene sorbitan monooleate containing an average of about 5 oxyethylene groups per molecule and having a hydrophile-lipophile balance of about 10, polyoxyethylene sorbitan tristearate containing an average of about 20 oxyethylene groups per molecule and having a hydrophile-lipophile balance of about 10.5 and polyoxyethylene sorbitan trioleate containing an average of about 20 oxyethylene groups per molecule and having a hydrophile-lipophile balance of about 11 to thereby form on filtration a filter cake which has better handling characteristics and which is further characterized by friability, a substantially lower proporation of water and a surface which is substantially devoid of moisture as compared to the filter cake formed when no such dewatering agent is added.

6. A process as described in claim 5 wherein the liquid hydrocarbon is kerosene.

7. A process as described in claim 6 wherein the kerosene is added in an amount of about 2 to 10 parts by weight.

8. A process as described in claim 5 wherein the dewatering agent is comprised of a mixture of kerosene and polyoxyethylene sorbitan monooleate containing an average of 5 oxyethylene groups per molecule hand having a hydrophile-lipophile balance of about 10.

9. A process as described in claim 5 wherein the dewatering agent is comprised of a mixture of kerosene and polyoxyethylene sorbitan tristearate containing an average of about 20 oxyethylene groups per molecule and having a hydrophile-lipophile balance of about 10.5.

10. A process as described in claim 5 wherein the dewatering agent is comprised of a mixture of kerosene and polyoxyethylene sorbitan trioleate containing an average of about 20 oxyethylene groups per molecule and having a hydrophile-lipophile balance of about 11.

References Cited in the file of this patent

UNITED STATES PATENTS

| Re. 21,032 | De Stubner | Mar. 21, 1951 |
| 1,960,917 | Nagelvoort | May 29, 1934 |
| 2,240,403 | Karlstrom | Apr. 29, 1941 |
| 2,394,083 | Lintz | Feb. 5, 1946 |
| 2,666,527 | Peterson | Jan. 19, 1954 |

OTHER REFERENCES

"Atlas Spans and Atlas Tweens," booklet copyright 1942, Atlas Powder Co., Wilmington, Delaware, pp. 4–6; pp. 7–16, inside front and back covers.

Antwerpen, Ind. and Engr. Chem., vol. 35, No. 1, Jan. 1943, p. 130.